(12) United States Patent
Vanhelle et al.

(10) Patent No.: US 10,466,788 B2
(45) Date of Patent: Nov. 5, 2019

(54) CONTROL INTERFACE WITH HAPTIC FEEDBACK

(71) Applicant: DAV, Créteil (FR)

(72) Inventors: Stéphane Vanhelle, Créteil (FR); Jean-Marc Tissot, Créteil (FR)

(73) Assignee: DAV, Créteil (FR)

( * ) Notice: Subject to any disclaimer, the term of this patent is extended or adjusted under 35 U.S.C. 154(b) by 10 days.

(21) Appl. No.: 14/917,585

(22) PCT Filed: Sep. 8, 2014

(86) PCT No.: PCT/FR2014/000200
§ 371 (c)(1),
(2) Date: Mar. 9, 2016

(87) PCT Pub. No.: WO2015/033033
PCT Pub. Date: Mar. 12, 2015

(65) Prior Publication Data
US 2016/0224114 A1 Aug. 4, 2016

(30) Foreign Application Priority Data
Sep. 9, 2013 (FR) .................................. 13 02100

(51) Int. Cl.
G06F 3/01 (2006.01)
B60K 37/06 (2006.01)
(Continued)

(52) U.S. Cl.
CPC .............. *G06F 3/016* (2013.01); *B60K 37/06* (2013.01); *G05G 5/03* (2013.01); *G06F 3/0362* (2013.01);
(Continued)

(58) Field of Classification Search
CPC ..... G06F 3/016; G06F 3/0362; H01H 25/065; B60K 37/06; G05G 1/08; G05G 5/03; G05G 9/047
See application file for complete search history.

(56) References Cited

U.S. PATENT DOCUMENTS 6,128,006 A * 10/2000 Rosenberg ............. G01C 21/36
345/161
2002/0057152 A1* 5/2002 Elferich .................. G05G 1/08
335/220
(Continued)

FOREIGN PATENT DOCUMENTS

DE 102004041690 A1 3/2005

OTHER PUBLICATIONS

International Search Report issued in corresponding application No. PCT/FR2014/000200 dated Mar. 12, 2014 (6 pages).
(Continued)

Primary Examiner — Vijay Shankar
Assistant Examiner — Cory A Almeida
(74) Attorney, Agent, or Firm — Osha Liang LLP

(57) ABSTRACT

The present invention relates to a control interface (1) with haptic feedback, in particular for a motor vehicle, intended to take account of an action of a user by providing him with haptic feedback, comprising a magneto-rheological fluid module (5), the said module (5) comprising: a rotary element (7) rotating about an axis (Z) of the module (5), said rotary element (7) being in contact with the magneto-rheological fluid and intended to be coupled with a gripping element (3), and a unit (9) for applying a magnetic field to the magneto-rheological fluid and configured so as to modify the intensity of said magnetic field.

19 Claims, 10 Drawing Sheets

Figure 1:
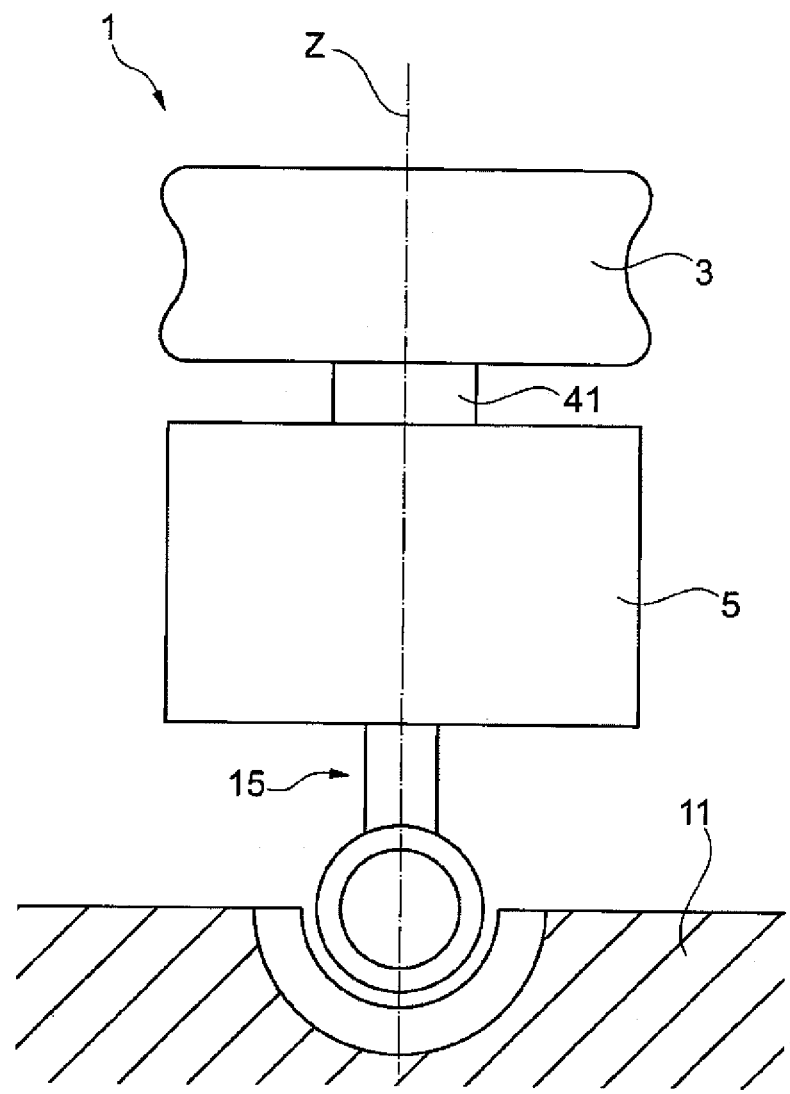

(51) Int. Cl.
*H01H 25/06* (2006.01)
*G06F 3/0362* (2013.01)
*G05G 5/03* (2008.04)
*G05G 1/08* (2006.01)
*G05G 9/047* (2006.01)

(52) U.S. Cl.
CPC ..... *H01H 25/065* (2013.01); *B60K 2370/126* (2019.05); *B60K 2370/158* (2019.05); *B60K 2370/193* (2019.05); *G05G 1/08* (2013.01); *G05G 9/047* (2013.01); *G05G 2009/04766* (2013.01)

(56) References Cited

U.S. PATENT DOCUMENTS

2006/0012584 A1* 1/2006 Vassallo .................. G06F 3/016
345/184
2006/0280575 A1* 12/2006 Ruettiger ............... B60K 37/06
411/15

OTHER PUBLICATIONS

Written Opinion of the International Searching Authority issued in corresponding application No. PCT/FR2014/000200 dated Mar. 12, 2014 (5 pages).

* cited by examiner

CONTROL INTERFACE WITH HAPTIC FEEDBACK

The present invention relates to a control interface and especially a rotary control interface or knob, in particular for a motor vehicle, enabling haptic feedback to be transmitted to a user, such as a force of variable resistance.

Haptic feedback, on knobs for example, is comprised of resistance forces of variable values, creating hard points and levels which correspond to different commands for the devices controlled via the interface in question. Haptic feedback is advantageous while driving as it requires little attention from the driver; in particular, it does not required the driver to look away from the road.

However, a control interface with a defined haptic feedback pattern can only be suitable for a limited number of functions to control. These functions must have the same number of possible controls, equal to the number of hard points, for example, on a complete range of a grip element. The number of control elements must be multiplied in order to obtain various haptic feedback patterns.

Furthermore, in order to navigate through menus and/or validate the functions selected, the knobs must often be coupled to other types of controls.

Thus, for controlling a set of functions, the control interfaces of the prior art are cumbersome and require numerous connections owing to the various control elements.

In order to reduce the dimension of the control interfaces and facilitate their connection, the subject of the invention is a control interface with haptic feedback, especially for a motor vehicle, designed to take into account an action of a user by providing him with haptic feedback, comprising a magnetorheological fluid module, said module comprising:
an element which rotates about an axis of the module, said rotary element being in contact with the magnetorheological fluid and designed to be coupled to a grip element,
a unit for applying a magnetic field to the magnetorheological fluid configured so as to modify the strength of said magnetic field,
wherein said magnetorheological fluid module is movably mounted in a chassis of the interface according to a predefined movement.

Such an interface makes it possible to obtain haptic feedback that is variable through reconfiguration of the application unit and allows a rotary control with reconfigurable haptic feedback to be combined with a second type of control while remaining compact and easy to power. A single interface module can now control several vehicle functions.

According to a further aspect of the present invention, the unit for applying a magnetic field to the magnetorheological fluid is configured to modify the strength of the magnetic field applied according to the rotation of the rotary element about the axis of the module.

Such an interface makes it possible to apply reconfigurable haptic feedback.

According to an additional aspect of the present invention, the magnetorheological fluid module is generally cylindrical in shape and the rotary element comprises an output shaft of the magnetorheological fluid module.

Such an interface makes it possible to provide an intermediate connection between the output shaft and the grip element.

According to a further aspect of the present invention, the control interface also comprises at least one sensor fixed in relation to the chassis of the interface and cooperating with the magnetorheological fluid module to trigger a control signal during a predefined movement.

Such an interface makes it possible to obtain a validation signal or to combine several types of commands.

According to another aspect of the present invention, the predefined movement corresponds to a translational movement along the axis of the module.

Such an interface makes it possible to validate a selected command if coupled with a switch.

According to an additional aspect of the present invention, the predefined movement corresponds to a pivoting movement made by a pivoting link or to a pivoting movement along two orthogonal axes performed by two pivoting links.

Such an interface makes it possible to obtain an additional command enabling a validation or an additional possibility to navigate in the menus.

According to another aspect of the present invention, the predefined movement corresponds to a translational movement along an axis substantially perpendicular to the axis of the module made by a sliding link, or to a translational movement along two orthogonal axes substantially perpendicular to the axis of the module made by two sliding links.

Such an interface makes it possible to obtain an additional command enabling a validation and/or an additional possibility to navigate in the menus.

According to another aspect of the present invention, the at least one sensor is a membrane switch.

Such an interface makes it possible to obtain a validation signal or to have validation haptic feedback.

According to an additional aspect of the present invention, the at least one sensor is a Hall effect sensor.

Such an interface makes it possible to obtain a validation signal.

According to another aspect of the present invention, the rotary element is coupled to an optical encoder configured to supply a signal representative of the angular position of the rotary element.

Such an interface makes it possible to know the angular position of the rotary control element in order to be able to apply the haptic feedback, especially according to the angular position and/or speed of rotation.

According to a further aspect of the present invention, the magnetorheological fluid module comprises a cavity containing the magnetorheological fluid, and the unit for applying a magnetic field comprises a coil placed around said cavity.

Such an interface is compact and easy to integrate in a chassis.

According to another aspect of the present invention, the control interface comprises an electronic circuit for managing the magnetorheological fluid module fastened to the chassis of the control interface and connected to said module by a flexible electric connection.

According to an additional aspect of the present invention, the electronic circuit for managing the magnetorheological fluid module comprises the at least one fixed sensor.

Figure 2:
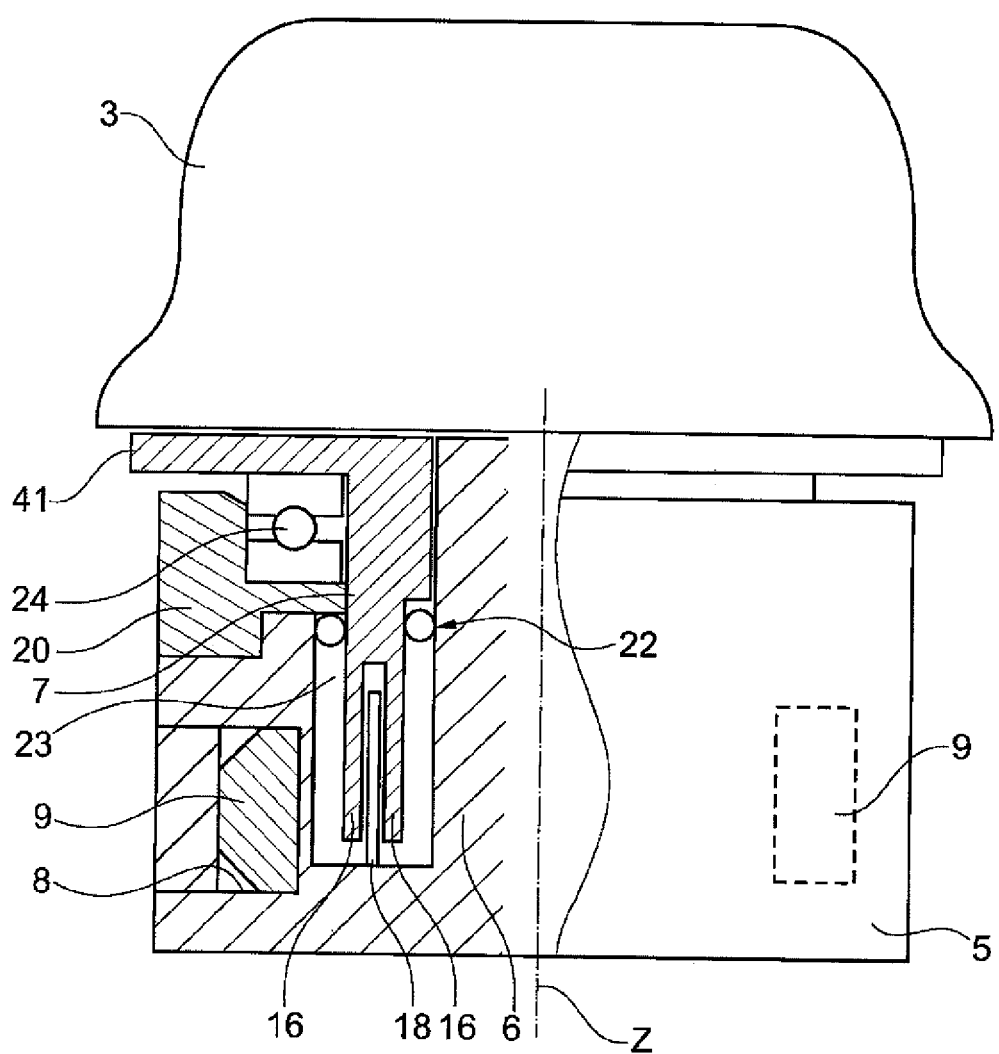
Figure 3:
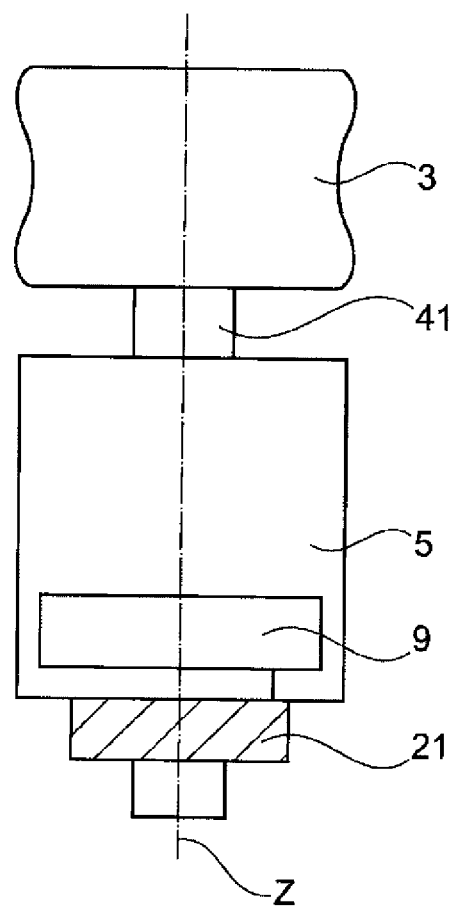
Figure 4:
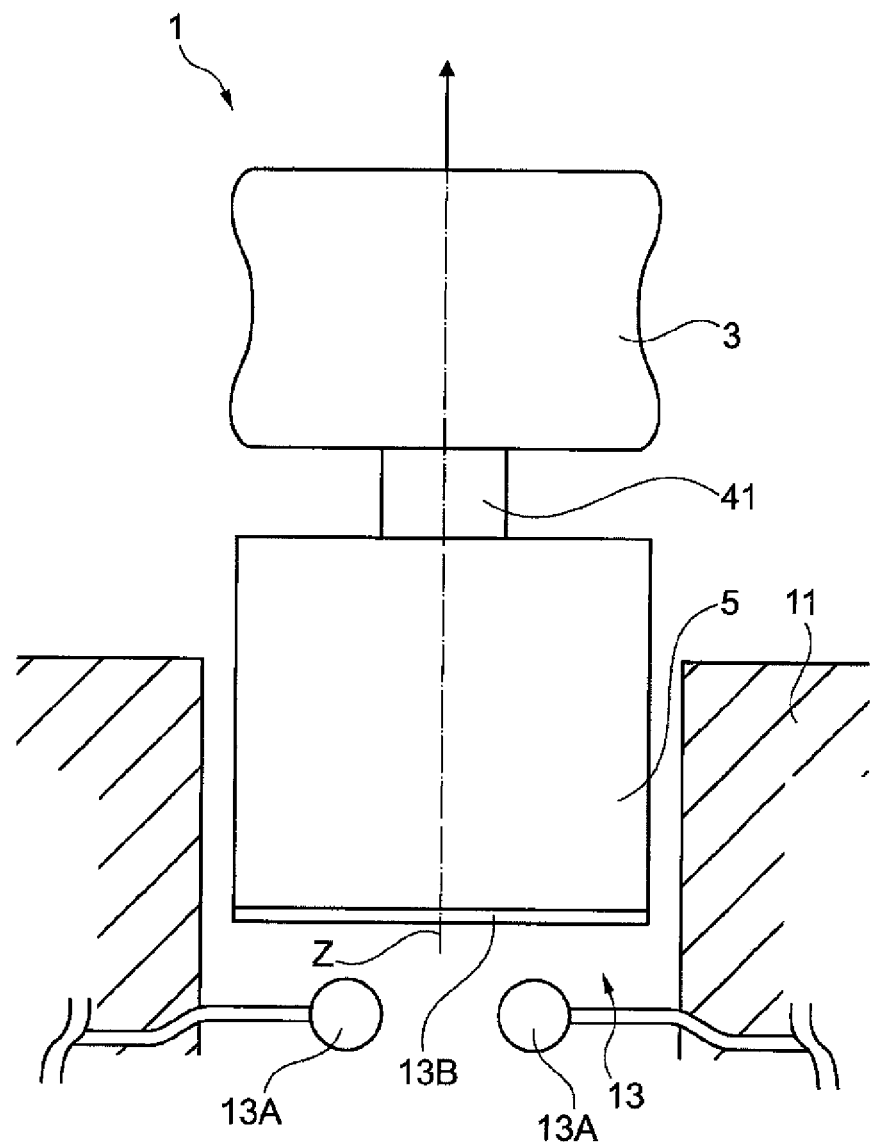
Figure 5:
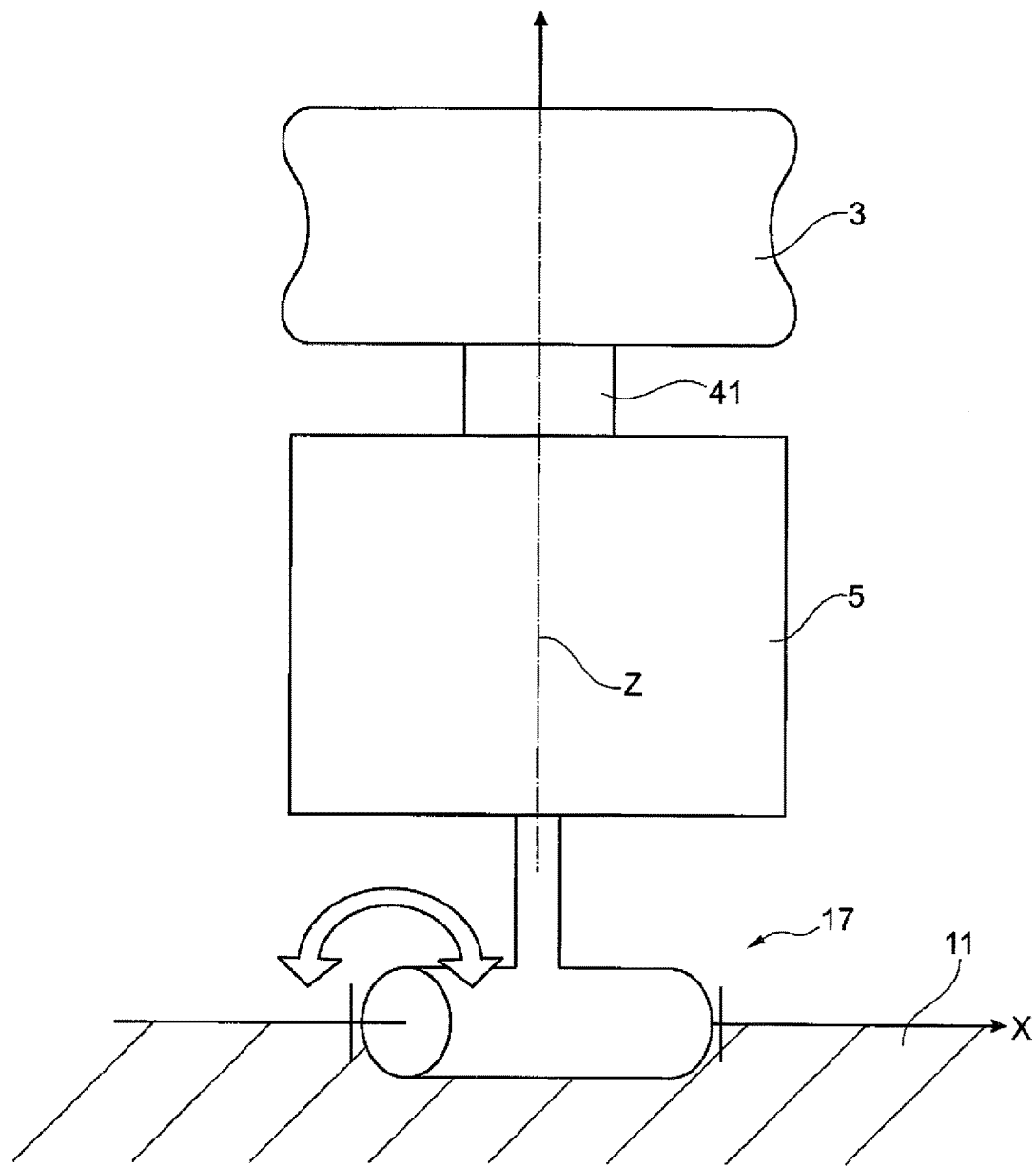
Figure 6:
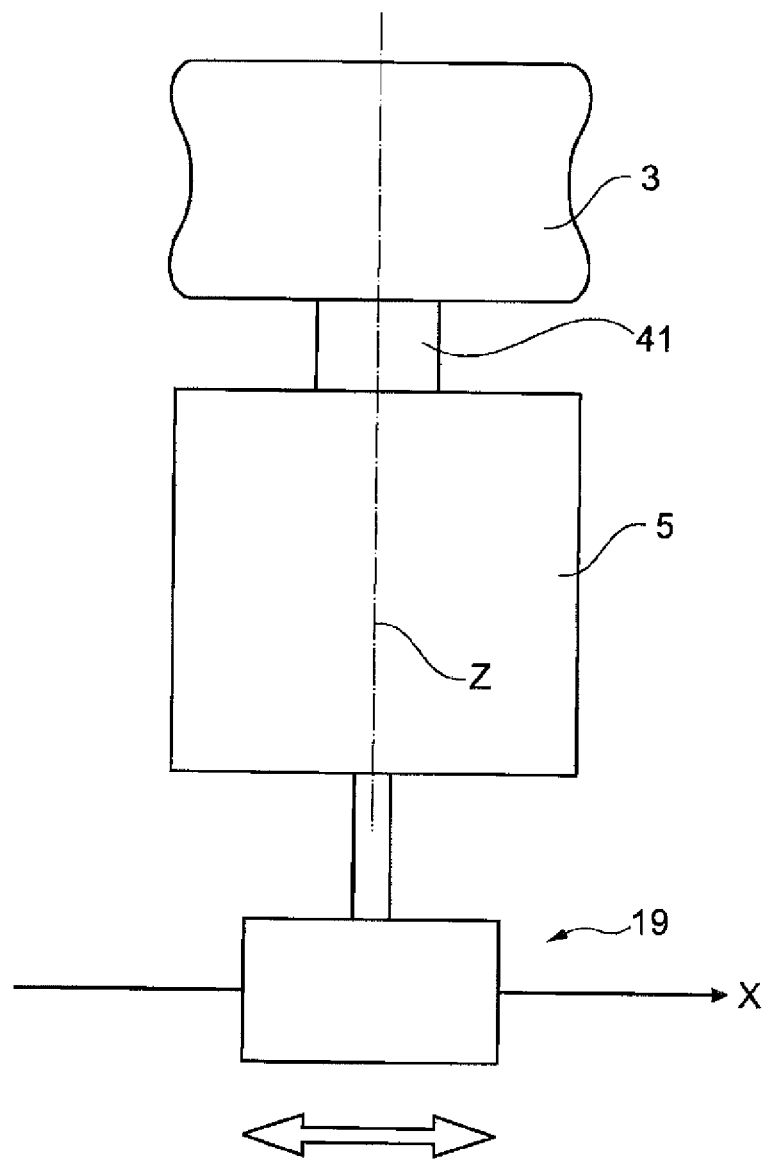
Figure 7:
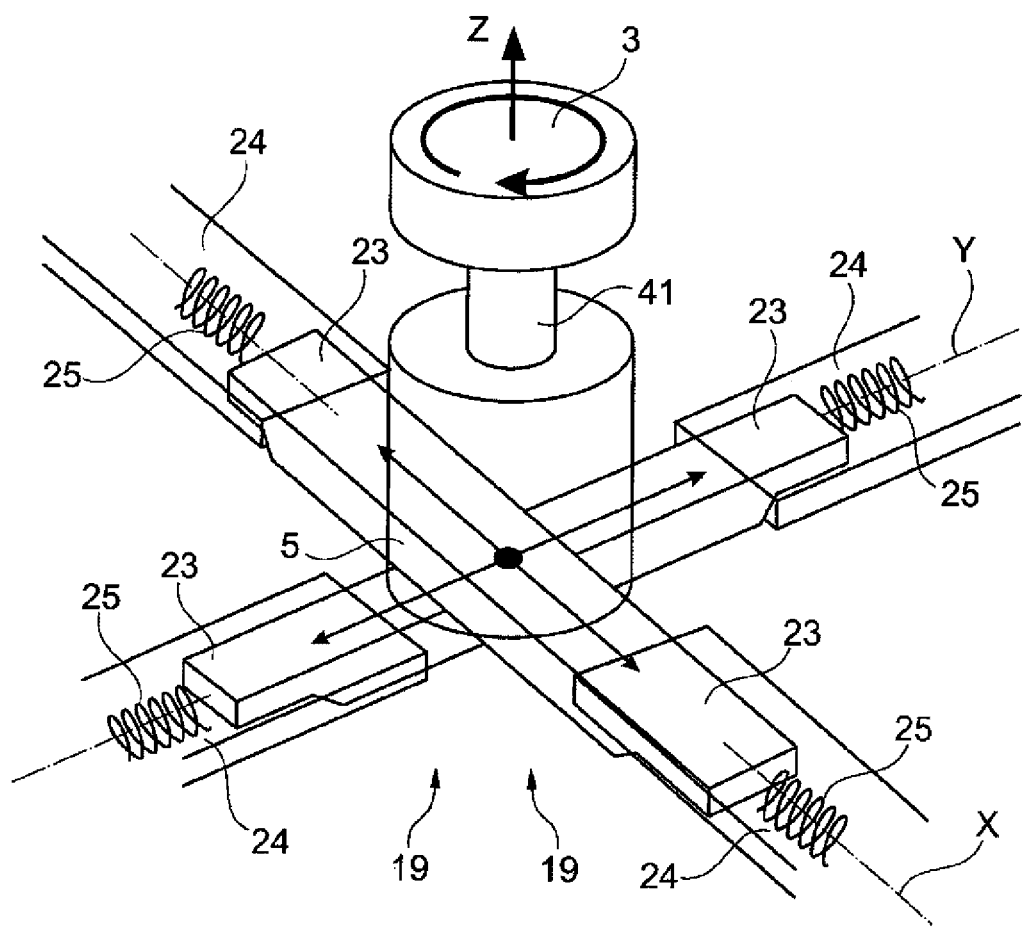
Figure 8:
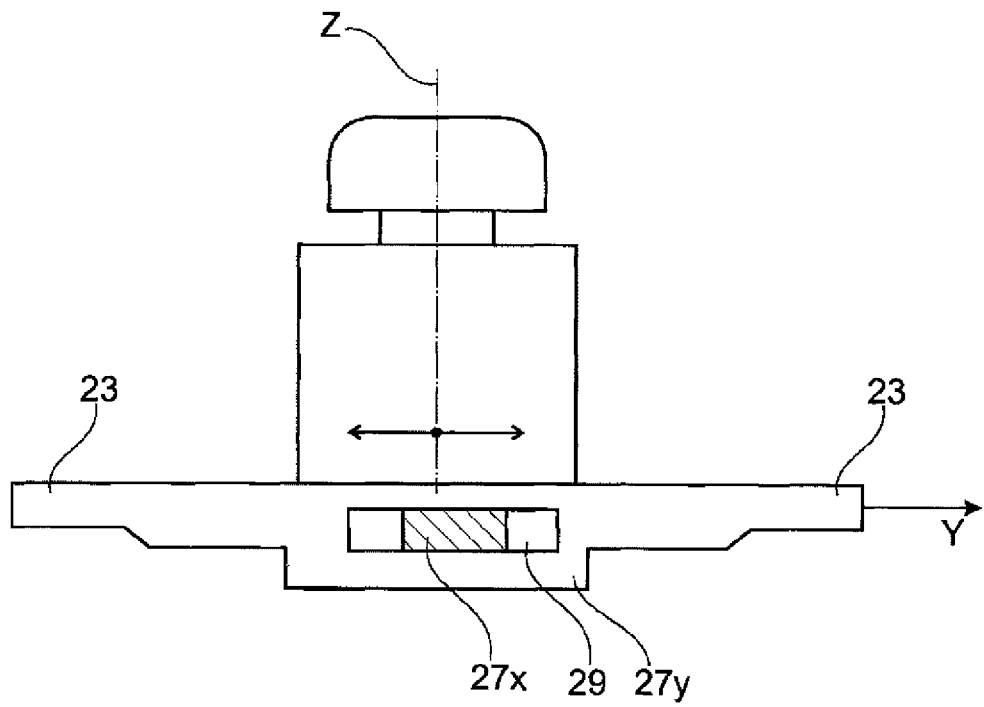
Figure 9:
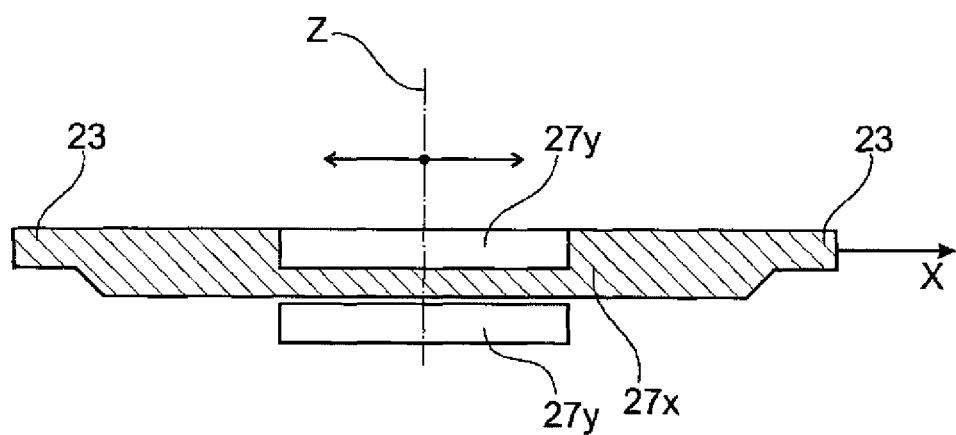
Figure 10:
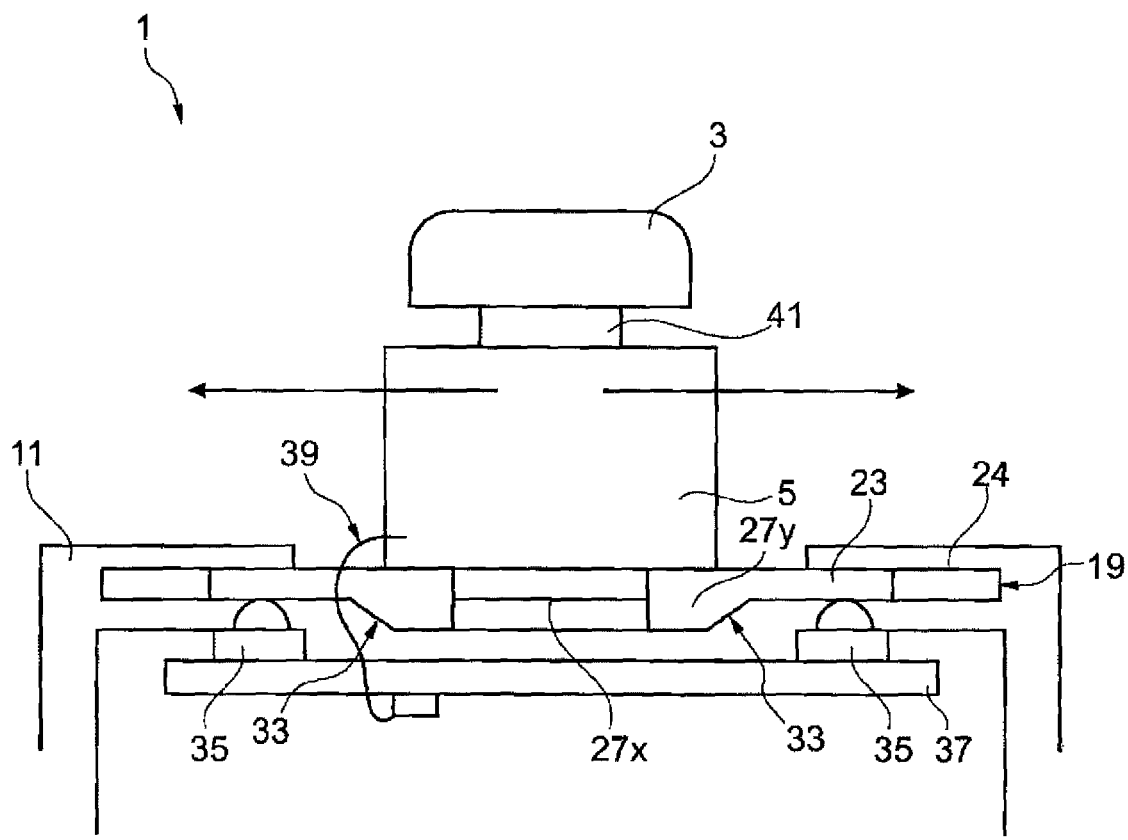
Figure 11A:
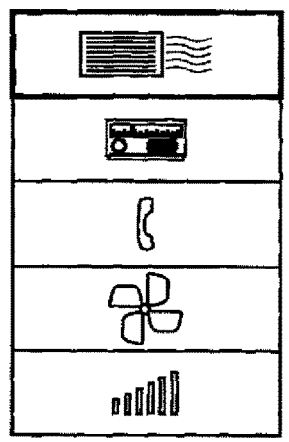
Figure 11B:
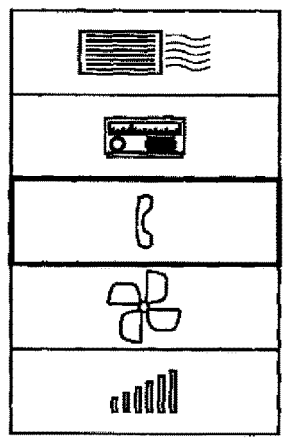
Figure 12:
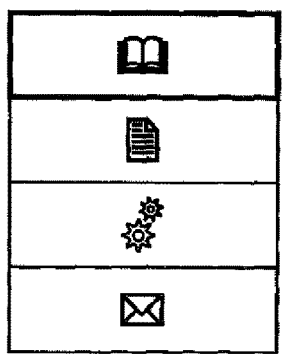

Further features and advantages of the invention will become more clearly apparent from reading the following description, given by way of example and in no way limiting, in reference to the appended drawings, in which:

FIG. 1 shows a control interface according to the present invention comprising a magnetorheological fluid module connected to a chassis of the interface by a hall joint connection, FIG. 2 shows a cross-sectional view of a magnetorheological fluid module and an associated grip element, FIG. 3 shows a magnetorheological fluid module comprising an optical position indicator, FIG. 4 shows a control interface according to the present invention comprising a magnetorheological fluid module movably mounted in translation on a chassis of the interface and coupled to a switch, FIG. 5 shows a control interface according to the present invention comprising a magnetorheological fluid module connected to a chassis of the interface by a pivoting link, FIG. 6 shows a control interface according to the present invention comprising a magnetorheological fluid module connected to a chassis of the interface by a sliding link, FIG. 7 shows an isometric view of a control interface according to the present invention comprising a magnetorheological fluid module connected to a chassis of the interface by two sliding links having orthogonal axes, FIGS. 8 and 9 show an embodiment of supports making it possible to obtain two perpendicular sliding links, FIG. 10 shows a sliding link architecture according to the present invention, FIGS. 11a and 11b show an example menu displayed on the screen of the vehicle when the control interface is activated, FIG. 12 shows an example menu relating to a telephone.

The same elements bear the same reference numbers in all the figures.

The invention relates to a control interface with haptic feedback 1, as shown in FIG. 1, for example for a dashboard of a motor vehicle, or for a central console of a motor vehicle, for controlling systems on board the vehicle. The control interface 1 comprises a magnetorheological fluid module 5 able to transmit haptic feedback to a user in the form of a resistance force applied to a grip element 3. In addition, this module 5 is movably mounted on a chassis 11 of the interface 1 so as to allow control additional to the rotation control provided by the module 5, for example a ball joint 15 locked in rotation along the Z axis in the case of FIG. 1.

The magnetorheological fluid module 5 shall first be described in detail, followed by a detailed description of the various embodiments of the installation of the module 5 on the chassis 11 of the interface 1.

FIG. 2 shows an example of a magnetorheological fluid module 5 that is cylindrical in shape along the Z axis of the module 5. The module 5 comprises a structure which is generally cylindrical and closed at one of its ends which comprises a fixed central axis 6 oriented along the Z axis around which is mounted the rotatable element 7 and a cavity 23 designed to receive the magnetorheological fluid on the one hand, and one extremity of the rotary element 7 on the other hand. The rotary element 7 is thus partially immersed in the magnetorheological fluid. The structure also includes a circular recess 8 that at least partially surrounds the cavity 23. The circular recess 8 receives one or several coil(s) which, with its (their) power supply(s) (not shown), form(s) a unit 9 for applying a magnetic field on the magnetorheological fluid.

The magnetic field created by a coil is proportional to the current flowing through it such that by varying the supply to the coil, one can vary the strength of the magnetic field created at the center of the coil and therefore of the magnetic field applied to the magnetorheological fluid, which allows the viscosity of the fluid to be varied.

Furthermore, the frictional force applied by the magnetorheological fluid on the rotary element 7 varies according to the surface area of fluid in contact with the mobile element 7. Thus, the rotary element 7 may comprise a plurality of walls 16 which are opposite the walls of the cavity 23. The cavity 23 may especially comprise a central wall 18 which is interposed between the walls 16 of the rotary element 7 to increase the opposing surface area between the rotary element 7 and the fixed walls 16, 18 of the cavity 23 and thus increase the force couple that can be exerted on the rotary element 7 with a given power supply.

On the other hand, in the embodiment of FIG. 2, the cavity 23 is closed by a cover 20 that compresses a seal 22 ensuring a hermetic seal so as to prevent any leakage of magnetorheological fluid. The cover 20 also comprises a housing to accommodate a bearing or ball bearing 24 which ensures the connection with the rotary element 7 and its rotational movement.

Furthermore, in the example shown in FIG. 2, the grip element 3 is integral, i.e. rigidly connected to the rotary element 7. The rotary element 7 has an output shaft 41 which connects the module 5 to the grip element 3. The grip element 3 is, for example, integral with the rotary element 7 or clipped onto the rotary element 7 or secured by a pin or by any other fastening means known in the prior art.

Alternatively, the grip element 3 can be coupled to the rotary element 7 via a system of gears, chains, belts or any other mechanical means of ensuring a rotational coupling between the grip element 3 and the rotary element 7. A system of gears especially serves to create a gear reduction between the rotation of the grip element 3 and the rotary element 7 to allow for more precise rotation control.

As shown in FIG. 3, the magnetorheological fluid module 5 also comprises a position sensor or encoder 21 of the rotary element 7 that allows one to know the angular position of the rotary element 7 so as to apply haptic feedback via the application unit 9 according to the angular position of the rotary element 7. The position encoder 21 can, for example, comprise a set of contacts and a brush, successively in contact with certain of said contacts when the element 7 is rotated.

Alternatively, the position encoder 21 can be an optical encoder comprising one or more optical forks or a piezoelectric device or any other position sensor known to those skilled in the art. The position encoder 21 can be arranged at different locations near the rotary element 7 and especially next to the grip element 3.

Furthermore, alternatively, the position encoder 21 can also be configured to determine the absolute angular position of the grip element 3 in relation to a reference point.

The unit 9 for applying a magnetic field to the magnetorheological fluid is thus connected to the position encoder 21 and is configured to produce the desired haptic feedback according to the signal provided. This application unit 9 is configured to receive a signal from the position encoder 21 and to determine a predetermined position of the grip element 3 according to the signal received, for example a certain number of indexing positions, and to modify the strength of the magnetic field when an indexing position is reached.

Different haptic feedback shapes or profiles can be obtained depending on the configuration of the application unit 9. For example, the strength of the magnetic field can have a square shape in which the strength is zero or weak except at the indexing positions where this strength is strong so as to create a significant friction force at the passage of indexing points. The viscosity of the magnetorheological fluid varies under the effect of a variable magnetic field such that the friction force induced by the magnetorheological fluid is low when the magnetic field is not applied and becomes increasingly stronger when the strength of the magnetic field increases. Thus, the application of a square-shaped intensity enables hard points to be created at the indexing points for which the intensity is high.

Depending on the position, other resistance force profiles or patterns are also possible, such as triangular or sawtooth profiles distributed around indexing positions, such that they are perceived as a progressive hard point to overcome, once to reach it, and once to move away or simply to reach it.

The application unit 9 can be reconfigured almost instantly by applying a different profile which allows, in particular, the position and/or the number of hard points to be varied. Thus, the module 5 can be used for several different functions, with different indexing position numbers and different haptic feedback profiles or shapes.

Resistance forces can also be used to improve the accuracy of the displacement of the grip element 3. For example, if a precise position in a range of positions must be reached, the resistance force can be decreased or increased depending on the rotational speed of the grip element 3, for example when scrolling through a list by reducing the resistance and/or the spacing between indexing points if the rotation of the grip element 3 is rapid and by increasing the resistance and the spacing between the indexing points when the speed is reduced or when approaching the end of the list. A very strong force can also be produced by supplying the coil with a strong current to simulate a stop, for example at the start or at the end of a list.

The resistance of the haptic feedback can also be adjusted by the user if he wishes a more or less pronounced haptic feedback, for example by adjusting a resistance parameter in a settings menu.

Thus, such a magnetorheological fluid module 5 allows a rotation control module to be obtained via a rotary button or knob corresponding to the grip element 3 that is compact and easy to power as one simply has to supply the application unit 9 and the position sensor 21. Thus, such a module 5 can easily be coupled to another type of control as described below.

According to a first embodiment shown in FIG. 4, the magnetorheological fluid module 5 is movably mounted in translation in relation to the chassis 11 of the control interface 1 in a direction corresponding substantially to the axis of the module 5, noted Z. The translational movement can be obtained by guide means located at the chassis 11 of the interface and enabling the module to slide along the Z axis.

Alternatively, the translational movement can be obtained by a pivoting link, whose axis is perpendicular to the Z axis and which is substantially far from the Z axis of the module 5 to produce a nearly translational movement of the module 5.

The chassis 11 of the control interface 1 also comprises a sensor enabling the translational displacement of the module 5 to be detected. The sensor, for example, consists of a switch 13, the translational movement of the module 5 closing the switch 13 by placing the conductor 13B, connected to the module 5, in contact with the contacts 13A integral with the chassis 11 when the user presses the module 5 in the direction of the Z axis. Such a switch 13 makes it possible to obtain, for example, a validation command coupled with the selection command provided by the module 5. The switch 13 is, for example, a membrane switch that can thus allow the module to return to position when the user releases pressure along the Z axis and supplies haptic validation feedback or a Hall effect sensor or any other sensor known to those skilled in the art and enabling detection of a translation movement of the module 5. A spring can also be coupled to a sensor to allow the module to return to position when the user releases his force along the Z axis.

According to a second embodiment shown in FIG. 5, the magnetorheological fluid 5 module 5 is movably mounted in rotation in relation to the chassis 11 of the control interface 1 in a direction substantially perpendicular to the Z axis of the module 5 by means of a pivoting link 17 around the X axis.

In this case of a single pivoting link 17, as shown in FIG. 5, the module 5 can incline in one single direction, in one direction or in both directions forming a lever that is able to tilt so as to provide an additional control.

Alternatively, the link is made by two pivoting links 17 having axes substantially perpendicular to one another. In this case, the module can be inclined in all directions, or in certain preferred directions, thus forming a "joystick" type control lever.

These pivoting links (single or double) are also coupled to at least one sensor making it possible to determine at least one inclination position of the lever-forming module 5. These sensors can consist of membrane switches, Hall effect sensors, optical sensors, magnetic sensors or any other type of sensor known to those skilled in the art and making it possible to detect the inclination position of the module 5 in relation to the chassis 11 of the control interface 1.

According to a third embodiment shown in FIGS. 6 to 10, the magnetorheological fluid module 5 is movably mounted in translation in relation to the chassis 11 of the control interface 1 in at least one direction substantially perpendicular to the Z axis of the module 5.

The link can be made by a single sliding link 19, as shown in FIG. 6. In this case, the module 5 can move in one single direction corresponding to the X axis, in one direction or in both directions to supply an additional control.

Alternatively, the link is made by two sliding links 19 having axes denoted X and Y, substantially perpendicular to one another and to the axis of the module 5 as shown in FIG. 7. The sliding links 19 are guided, for example, by four pins 23 designed to slide in four complementary grooves 24. Return springs 25 are provided between the ends of the pins 23 and the ends of the grooves 24 in order to reposition the module 5 in the central position, i.e. at the center of the two sliding links 19, when the user is not applying force in either of the directions along axes X and Y. The two sliding links 19 are configured to slide in relation to one another as shown in FIGS. 8 and 9. FIG. 8 represents the pins 23 and their support 27 along the Y axis, designated 27*y*. The support 27*y* comprises a central opening 29 into which the support 27*x* of the pins 23 is inserted along the X axis. In addition, the central opening 27*y* is larger than the width of the support 27*x* along the X axis so as to leave a space for the displacement of the support 27*y* along the Y axis. FIG. 9 shows the support 27*x* along the X axis and the arrangement of the support 27*y* along the Y axis around the support 27*x*.

These sliding links 19 are also coupled to at least one sensor making it possible to determine at least one translation of the module 5 along the axis of a sliding link 19. These sensors can consist of membrane switches, Hall effect sensors, optical sensors, magnetic sensors or any other type of sensor known to those skilled in the art and making it possible to detect the inclination position of the module 5 in relation to the chassis 11 of the control interface 1.

FIG. 10 shows an example of an embodiment wherein at least one switch 35, one for each pin 23 in this case, is mounted on the chassis 11 of the control interface 1 and wherein the supports 27 of the pins 23 comprise chamfers forming contact ramps 33 that bear against the switch 35 when the module 5 is moved along the axis of the sliding link 19 in the direction of the switch 35. The switches 35 can be mounted on a printed circuit or electronic circuit 37 that also ensures the power supply of the module 5, for example by means of a flexible connection 39.

In all the embodiments described above, the power supply and the management of the module 5 (for the application unit 9, the position encoder 21 and the other equipment possibly mounted on the module 5) can be made by an electronic circuit 37 disposed on the chassis 11 and connected to the module by means of an electric connection or flexible connection 39. The fixed sensors can thus be mounted directly on the electronic circuit 37. In addition, this electronic circuit 37 can also be connected via a communication interface to a central management unit of the vehicle. The communication interface is, for example, a Controller Area Network (CAN) type or a Local Interconnect Network (LIN) type bus.

The present invention also covers other linking methods known to those skilled in the art such as, for example, a ball-joint link as represented in FIG. 1 wherein the rotation along the Z axis is removed. Guides can also limit the angular freedom of the ball-joint link, in two perpendicular directions for example.

The present invention also concerns a combination of the linking methods described above such as, for example, an assembly comprising two pivoting links 17 and a link in translation along the Z axis of the module 5 enabling a multitude of controls for the purpose of selecting or activating controls for example.

In order to better understand the present invention, an operating example based on a module 5 mounted in translation along the axis of the module 5 and coupled to a switch 13 will now be described in detail. The module 5 is mounted on a control interface 1 arranged on the central console of the vehicle and designed to control the various equipment of the vehicle.

FIG. 11a shows an example of a basic menu displayed on the screen of the vehicle when the vehicle equipment control interface is activated. The menu includes five equipment elements: air conditioning, radio, telephone, ventilation and volume control. The equipment located at the top of the list (air conditioning in this case) is selected by default (represented by display in bold-faced type) and the user can scroll from one equipment element to the next by turning the knob corresponding to the grip element 3 of the module 5. Passing from one equipment element to the next is signalled by a hard point corresponding to a greater resistance at the knob so that the user knows that he is passing from one equipment element to another. When the user has selected the desired equipment element, the telephone for example in this case, as shown in FIG. 11b by passing two hard points, he presses the module so as to actuate the switch 13 associated with the module 5. Actuation of the switch 13 validates the equipment element selected (the telephone in this case) and the passage into a new menu dedicated to the telephone comprises four sections (contacts, text, settings and messaging) as shown in FIG. 12. Upon selecting the contacts section, the user can press or click the module 5 to validate the command and enter the contacts menu. The contacts menu thus comprises list of names that can be quite extensive. In this case, the resistance and the position of hard points induced by haptic feedback can depend on the speed of rotation of the grip element 3 or knob. A rapid speed of rotation can allow for low resistance and bring hard points closer together so as to rapidly reach the end of the list, the module 5 being reconfigured in real time according to the rotation speed brought about by the user, when the user decreases the rotation speed, the hard points are then spaced further apart and are more pronounced so as to clearly separate two distinct selections.

Once the contact sought has been selected, the user can then press the module to initiate the call or open a new menu offering various possibilities of the equipment with regard to the contact selected (call, send an electronic message, send a short text message (SMS), etc.).

Thus, the present invention makes it possible to obtain a control interface that is compact and easy to install owing to the limited number of elements to be powered and enabling a large number of controls with reconfigurable haptic feedback and thus adapted to each control.

The invention claimed is:

1. A control interface with haptic feedback for a motor vehicle, the control interface responding to an action of a user by providing the user with haptic feedback, comprising a magnetorheological fluid module, said module comprising:
    a grip element;
    a rotary element that rotates in a rotational movement about an axis of the magnetorheological fluid module, said rotary element being partially immersed in the magnetorheological fluid and integrally connected to the grip element, and
    a unit that applies a magnetic field to the magnetorheological fluid, and modifies the strength of said magnetic field, wherein said module is movably mounted in a chassis of the control interface in a predefined movement,
    wherein:
        the predefined movement is separate from the rotational movement,
        the rotary element is mounted around a fixed central axis so as to not directly overlap the axis of the magnetorheological fluid module, the fixed central axis being oriented along the axis of the magnetorheological fluid module, and
        the magnetorheological fluid module comprises a cavity, the cavity having a circular pattern when viewed from above and containing the magnetorheological fluid so as to not overlap the axis of the magnetorheological fluid module.

2. The control interface as claimed in claim 1, wherein the unit for applying a magnetic field to the magnetorheological fluid is configured to modify the strength of the magnetic field applied in the rotation of the rotary element about the axis of the module.

3. The control interface as claimed in claim 1,
    wherein the magnetorheological fluid module is generally cylindrical in shape, and
    wherein the rotary element has an output shaft of the magnetorheological fluid module.

4. The control interface as claimed in claim 1, further comprising at least one sensor fixed in relation to the chassis of the interface cooperates with the magnetorheological fluid module to trigger a control signal during the predefined movement.

5. The control interface as claimed in claim 4, wherein the predefined movement corresponds to a translational movement along the axis of the module.

6. The control interface as claimed in claim 5, further comprising an electronic circuit for managing the magnetorheological fluid module fastened to the chassis of the control interface and connected to said module by a flexible electric connection.

7. The control interface as claimed in claim 6, wherein the electronic circuit for managing the module comprises the at least one fixed sensor.

8. The control interface as claimed in claim 4, wherein the predefined movement corresponds to a pivoting movement made by a pivoting link or to a pivoting movement along two orthogonal axes performed by two pivoting links.

9. The control interface as claimed in claim 4, wherein the predefined movement corresponds to a translational movement along an axis substantially perpendicular to the axis of the module made by a sliding link, or to a translational movement along two orthogonal axes substantially perpendicular to the axis of the module made by two sliding links.

10. The control interface as claimed in claim 4, wherein the at least one sensor is a membrane switch.

11. The control interface as claimed in claim 4, wherein the at least one sensor is a Hall effect sensor.

12. The control interface as claimed in claim 1, wherein the rotary element is coupled to a position encoder that supplies a signal representative of the angular position of the rotary element.

13. The control interface as claimed in claim 1, wherein the unit for applying a magnetic field comprises a coil placed around said cavity.

14. The control interface as claimed in claim 1, comprising the magnetorheological fluid module, said module comprising:
a structure that is cylindrical and closed at one of its ends.

15. A control interface with haptic feedback for a motor vehicle, the control interface responding to an action of a user by providing the user with haptic feedback, the control interface comprising:
a magnetorheological fluid module, said module comprising:
a rotary element which rotates in a rotational movement about an axis of the magnetorheological fluid module, said rotary element being partially immersed in the magnetorheological fluid and integrally connected to a grip element, and
a unit that applies a magnetic field to the magnetorheological fluid, and modifies the strength of said magnetic field, wherein said module is movably mounted in a chassis of the control interface in a predefined movement,
wherein:
the predefined movement is separate from the rotational movement,
the rotary element is mounted around a fixed central axis so as to not directly overlap the axis of the magnetorheological fluid module, the fixed central axis being oriented along the axis of the magnetorheological fluid module,
the magnetorheological fluid module comprises a cavity, the cavity having a circular pattern when viewed from above and containing the magnetorheological fluid so as to not overlap the axis of the magnetorheological fluid module, and
the unit for applying a magnetic field comprises a coil placed around said cavity.

16. The control interface as claimed in claim 15, wherein the rotary element further comprises a plurality of walls that are opposite to a plurality of fixed walls of the cavity.

17. The control interface as claimed in claim 16 wherein the cavity further comprises a central wall, the central wall being interposed between the plurality of walls of the rotary element to increase an opposing surface area between the rotary element and the plurality of fixed walls of the cavity and
the increase in the opposing surface increases a force couple that is exerted on the rotary element with a given power supply.

18. The control interface as claimed in claim 17, wherein the magnetorheological fluid contained in the cavity covers an entirety of the central wall.

19. The control interface as claimed in claim 15, wherein the cavity is closed by a cover that compresses a seal ensuring a hermetic seal that prevents any leakage of magnetorheological fluid.

* * * * *